(12) United States Patent
Buck et al.

(10) Patent No.: US 10,760,927 B2
(45) Date of Patent: Sep. 1, 2020

(54) SENSOR ARRANGEMENT FOR CONTACTLESS LINEAR POSITION DETECTION

(71) Applicant: Robert Bosch GmbH, Stuttgart (DE)

(72) Inventors: Thomas Buck, Tamm (DE); Anna Krause, Pforzheim (DE); Stefan Leidich, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 192 days.

(21) Appl. No.: 15/923,714

(22) Filed: Mar. 16, 2018

(65) Prior Publication Data
US 2018/0283902 A1 Oct. 4, 2018

(30) Foreign Application Priority Data
Mar. 31, 2017 (DE) .................. 10 2017 205 472

(51) Int. Cl.
*G01B 7/14* (2006.01)
*G01D 5/14* (2006.01)
*G01D 5/16* (2006.01)

(52) U.S. Cl.
CPC .............. *G01D 5/147* (2013.01); *G01D 5/16* (2013.01)

(58) Field of Classification Search
CPC ............ G01D 5/14; G01D 5/16; G01D 5/145; G01D 5/147; G01D 5/12; G01D 5/165; G01D 5/2457; G01D 5/2013; G01D 5/2046; G01D 5/24476; G01D 5/245; G01P 3/443; G01P 3/488; G01P 3/487; G01P 3/481; G01P 3/685; G01R 33/025; G01R 33/07; G01R 33/0206; G01R 33/06; G01R 33/063; G01R 33/09; G01R 33/093; G01R 33/0052; G01R 33/18; G01N 27/9033; G01N 27/902; G01N 27/9013;
(Continued)

(56) References Cited

U.S. PATENT DOCUMENTS 6,411,081 B1 * 6/2002 Spellman ............... G01D 5/145
324/207.21
7,268,536 B2 * 9/2007 Hagino .................. G01D 5/145
324/207.2
(Continued)

FOREIGN PATENT DOCUMENTS

DE    10 2004 033 083 A1    1/2006

*Primary Examiner* — Thang X Le
(74) *Attorney, Agent, or Firm* — Maginot, Moore & Beck LLP

(57) ABSTRACT

A sensor arrangement for contactless linear position detection includes a target having a measuring transducer running along a measuring path, and a magnetic field sensor arranged at a distance from the measuring transducer and in a relatively movable manner along the measuring path. The magnetic field sensor at least partially covers the measuring transducer. The measuring transducer is magnetically conductive. The magnetic field sensor includes a carrier having at least one measuring sensor with a two-dimensional or three-dimensional detection range, and at least one permanent magnet that generates a local magnetic field. The magnetic flux of the at least one permanent magnet is introduced into the measuring transducer, which includes an influencing device configured to influence the introduced magnetic flux based on a current position of the magnetic field sensor along the measuring path.

20 Claims, 5 Drawing Sheets

(58) Field of Classification Search
CPC .... G01N 27/904; G01N 27/223; G01N 27/82; G01N 27/9093
See application file for complete search history.

(56) References Cited

U.S. PATENT DOCUMENTS

| | | | |
|---|---|---|---|
| 7,463,023 B1* | 12/2008 | Moreno | G01D 5/145 324/207.2 |
| 9,151,591 B2* | 10/2015 | Reymann | G01D 5/2033 |
| 9,217,628 B2* | 12/2015 | Howard | G01B 7/003 |
| 2015/0176962 A1* | 6/2015 | Kerdraon | G01B 7/14 324/207.24 |

\* cited by examiner

SENSOR ARRANGEMENT FOR CONTACTLESS LINEAR POSITION DETECTION

This application claims priority under 35 U.S.C. § 119 to patent application no. DE 10 2017 205 472.7, filed on Mar. 31, 2017 in Germany, the disclosure of which is incorporated herein by reference in its entirety.

The disclosure is based on a sensor arrangement for contactless linear position detection.

BACKGROUND

Linear position sensors with magnetic fields are fundamentally known. There are magnetic sensors which detect a distance to a magnet or a lateral displacement with respect to a magnet. The disadvantage of such magnetic sensors can be considered to be the fact that they have only a very limited measuring range (<2 cm) or require very strong or very large magnets in order to be able to cover a longer measuring path. However, it is also possible to use a plurality of such magnetic sensors to cover a larger measuring range. In some cases, it is necessary to count pulses, which makes it necessary to number the magnetic sensor using another method or a further end or reference point sensor.

The prior art also discloses sensor arrangements which are based on the eddy current principle and have eddy current coils for contactless position detection. The coils are electrically loaded by a metal target, with the result that the oscillation frequencies of at least three coils are changed, with the result that the linear position can be derived from the frequency change.

DE 10 2004 033 083 A1 discloses, for example, an eddy current sensor for continuous position or angle measurement. The eddy current sensor comprises a sensor and a conductive transducer, the sensor comprising at least one coil for generating eddy currents in the conductive transducer. The sensor and the transducer can move relative to one another in a direction of movement. A time-continuous position or angle measurement can be achieved by virtue of the transducer having a conductive track which is configured such that the complex impedance of the coil continuously changes when scanning the track in the direction of movement.

SUMMARY

The sensor arrangement for contactless linear position detection having the features disclosed herein has the advantage that a simple target and a commercially available measuring sensor are used for the position detection. A simple and cost-effective sensor arrangement for contactless linear position detection can therefore be provided using a single magnetic field sensor and a simple target. On account of the fact that magnetic field sensors are available for virtually any specification, the investment costs are very low. In addition, embodiments of the sensor arrangement according to the disclosure for contactless linear position detection can be easily extended to a large measuring range of 10 to 30 cm. In addition, the sensor information is available directly after switch-on without a reference variable or an incremental encoder, which is favorable for most automobile applications. Furthermore, it is advantageously possible to easily implement many different configurations and constructions with at least one magnetic field sensor, which has a two-dimensional or three-dimensional detection range, and various target forms with different sensitivities and ranges. This enables simple adaptation to different applications. A general advantage of the magnetic sensitivity principles is the fundamental immunity to radio-frequency interference (RF EMI).

Embodiments of the present disclosure provide a sensor arrangement for contactless linear position detection, having a target which comprises a measuring transducer running along a measuring path, and having a magnetic field sensor which is arranged at a distance from the measuring transducer and in a relatively movable manner along the measuring path and at least partially covers the measuring transducer. In this case, the measuring transducer is magnetically conductive and the magnetic field sensor comprises a carrier having at least one measuring sensor, which has a two-dimensional or three-dimensional detection range, and having at least one permanent magnet which generates a local magnetic field, the magnetic flux of which is introduced into the measuring transducer, the measuring transducer having means which are suitable for influencing the introduced magnetic flux on the basis of the current position of the magnetic field sensor along the measuring path, the at least one measuring sensor detecting a current direction of the magnetic field, and an evaluation and control unit evaluating the current direction of the magnetic field in order to determine the current position of the magnetic field sensor based on the measuring path.

The ferromagnetic material of the measuring transducer, for example steel, is selected such that it cannot be magnetized by the at least one permanent magnet. This makes it possible to advantageously prevent the magnetic field sensor from drifting or exhibiting hysteresis effects.

In the present case, the evaluation and control unit can be understood as meaning an electrical device, for example a control device, or an assembly which can process and evaluate captured sensor signals. In addition, the evaluation and control unit can also be integrated in the magnetic field sensor or the measuring sensor. The evaluation and control unit may have at least one interface which may be designed using hardware and/or software. In the case of a hardware design, the interfaces may be, for example, part of a so-called system ASIC which comprises a wide variety of functions of the evaluation and control unit. However, it is also possible for the interfaces to be separate integrated circuits or to at least partially comprise discrete components. In the case of a software design, the interfaces may be software modules which are present on a microcontroller in addition to other software modules, for example. Also advantageous is a computer program product having program code which is stored on a machine-readable carrier, such as a semiconductor memory, a hard disk memory or an optical memory, and is used to carry out the evaluation when the program is executed by the evaluation and control unit.

In the present case, a measuring sensor is understood as meaning a structural unit comprising at least one sensor element which directly or indirectly captures a physical variable or a change in a physical variable and preferably converts it into an electrical sensor signal.

Advantageous improvements in the sensor arrangement for contactless linear position detection are possible as a result of the measures and developments disclosed herein.

It is particularly advantageous that the measuring transducer can have at least one air gap with a predefined width and length, the longitudinal direction of which runs at a predefined angle with respect to the measuring path. This enables a particularly simple design of the target which, for example, is in the form of a steel plate with a slot having the predefined length and width. The detection can be improved further by using a plurality of measuring sensors or a plurality of air gaps in order to increase the resolution, the operating range or the immunity to external fields.

In one advantageous configuration of the sensor arrangement, the at least one measuring sensor below the air gap can detect the direction of the magnetic field at a first edge of the air gap in a starting position and at a second edge of the air gap in an end position and can be moved along the measuring path from the starting position to the end position over the width of the air gap and can detect the direction of the magnetic field over the width of the air gap. The at least one measuring sensor may be in the form of a Hall sensor element or a GMR sensor element or an AMR sensor element, for example. Such sensor elements are available in a sufficient number in a cost-effective manner as mass products. In addition, the at least one measuring sensor can be arranged on a surface of the carrier facing the measuring transducer.

In another advantageous configuration of the sensor arrangement, a spacer can be arranged between the at least one measuring sensor and the measuring transducer. The spacer separates the measuring sensor from the measuring transducer and advantageously protects the measuring sensor from environmental influences, for example water, dust, oil etc.

In another advantageous configuration of the sensor arrangement, a permanent magnet can be arranged below the at least one measuring sensor on a surface of the carrier facing away from the measuring transducer. In addition, the permanent magnet can cover the at least one measuring sensor and the air gap, two magnetic conductors being able to conduct the magnetic flux in the direction of the measuring transducer.

In one alternative configuration of the sensor arrangement, two permanent magnets can be laterally integrated in the carrier beside the at least one measuring sensor and can be oriented in the direction of the measuring transducer. In addition, a magnetic conductor can be arranged on a surface of the carrier facing away from the measuring transducer and can connect the two permanent magnets to one another and can cover the air gap.

In another alternative configuration of the sensor arrangement, a permanent magnet can be integrated in the carrier under the at least one measuring sensor. Furthermore, the at least one measuring sensor can cover the permanent magnet, a magnetic conductor being able to be arranged on a surface of the carrier facing away from the measuring transducer and being able to cover the measuring sensor and the air gap.

In another alternative configuration of the sensor arrangement, a permanent magnet can be integrated in the carrier upstream or downstream of the at least one measuring sensor in the direction of the measuring path and can cover the air gap. In addition, a magnetic conductor can be arranged under the permanent magnet on a surface of the carrier facing away from the measuring transducer and can cover the permanent magnet and the air gap.

Exemplary embodiments of the disclosure are illustrated in the drawing and are explained in more detail in the following description. In the drawing, identical reference symbols denote components or elements which carry out identical or similar functions.

DETAILED DESCRIPTION

Figure 1:
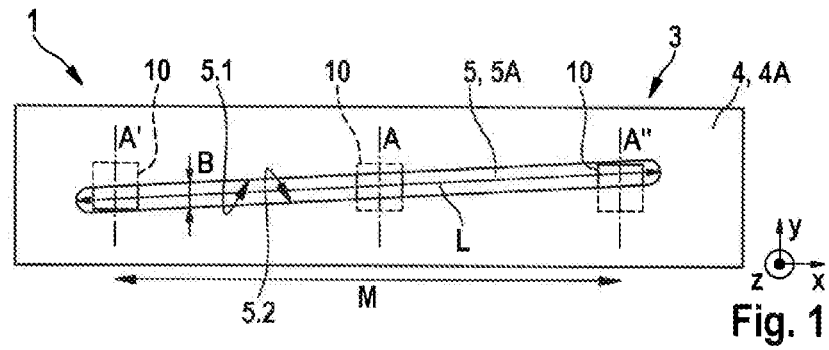
FIG. 1 shows a schematic illustration of one exemplary embodiment of a sensor arrangement according to the disclosure for contactless linear position detection.

As is clear from FIGS. 1 to 11, illustrated exemplary embodiments of a sensor arrangement 1, 1A, 1B, 1C, 1D according to the disclosure for contactless linear position detection each comprise a target 3 which comprises a measuring transducer 4 running along a measuring path M, and a magnetic field sensor 10, 10A, 10B, 10C, 10D which is arranged at a distance from the measuring transducer 4 and in a relatively movable manner along the measuring path M and at least partially covers the measuring transducer 4. In this case, the measuring transducer 4 is magnetically conductive and the magnetic field sensor 10, 10A, 10B, 10C, 10D comprises a carrier 14A, 14B, 14C, 14D having at least one measuring sensor 12, which has a two-dimensional or three-dimensional detection range, and having at least one permanent magnet 16A, 16B, 16C, 16D. The at least one permanent magnet 16A, 16B, 16C, 16D generates a local magnetic field 7A, 7B, 7C, 7D, the magnetic flux of which is introduced into the measuring transducer 4. The measuring transducer 4 has means 5 which are suitable for influencing the introduced magnetic flux on the basis of the current position A', A, A" of the magnetic field sensor 10, 10A, 10B, 10C, 10D along the measuring path M. The at least one measuring sensor 12 detects a current direction R of the magnetic field 7A, 7B, 7C, 7D and an evaluation and control unit evaluates the current direction R of the magnetic field 7A, 7B, 7C, 7D in order to determine the current position A', A, A" of the magnetic field sensor 10, 10A, 10B, 10C, 10D based on the measuring path M.

As is also clear from FIGS. 1 to 11, the measuring transducer 4 in the illustrated exemplary embodiments is in the form of a steel plate with a slot which specifies an air gap 5A having a predefined width B and length L, the longitudinal direction of which runs at a predefined angle with respect to the measuring path M. It goes without saying that the measuring transducer 12 can also be produced from another suitable ferromagnetic material.

As is also clear from FIGS. 1 to 11, only one measuring sensor 12 is arranged below the air gap 5A on a surface of the carrier 14A, 14B, 14C, 14D facing the measuring transducer 4 in the illustrated exemplary embodiments. In addition, a spacer 11 is arranged between the measuring sensor 12 and the measuring transducer 4. The measuring sensor 12 may be in the form of a Hall sensor element or a GMR sensor element or an AMR sensor element, for example. In the illustrated exemplary embodiments, the measuring sensor 12 has a two-dimensional detection range and can detect the direction R of the magnetic field 7A, 7B, 7C, 7D in the y-z plane. Alternatively, the measuring sensor 12 may have a three-dimensional detection range and can detect the direction R of the magnetic field 7A, 7B, 7C, 7D in the x-y-z space. The measuring sensor 12 detects the direction R of the magnetic field 7A, 7B, 7C, 7D at a first edge 5.1 of the air gap 5A in a starting position A'. In an end position A", the measuring sensor 12 detects the direction R of the magnetic field 7A, 7B, 7C, 7D at a second edge 5.2 of the air gap 5A. If the magnetic field sensor 10, 10A, 10B, 10C, 10D or the carrier 14A, 14B, 14C, 14D with the measuring sensor 12 and the at least one permanent magnet 16A, 16B, 16C, 16D is moved along the measuring path M, the permanent magnet 16A, 16B, 16C, 16D generates the local magnetic field 7A, 7B, 7C, 7D, which runs through the air gap 5A over the width B, at the current position A', A, A". Since the air gap 5A has a predefined angle with respect to the measuring path M, the measuring sensor 12 moves from the starting position A' to the end position A" during movement along the measuring path M over the width B of the air gap 5A and detects the direction R of the magnetic field 7A, 7B, 7C, 7D over the width B of the air gap 5A. Since the direction of the magnetic field 7A, 7B, 7C, 7D changes over the width B of the air gap 5A, the detected direction R of the magnetic field represents the current position A of the measuring sensor 12 along the measuring path M.

Figure 2:
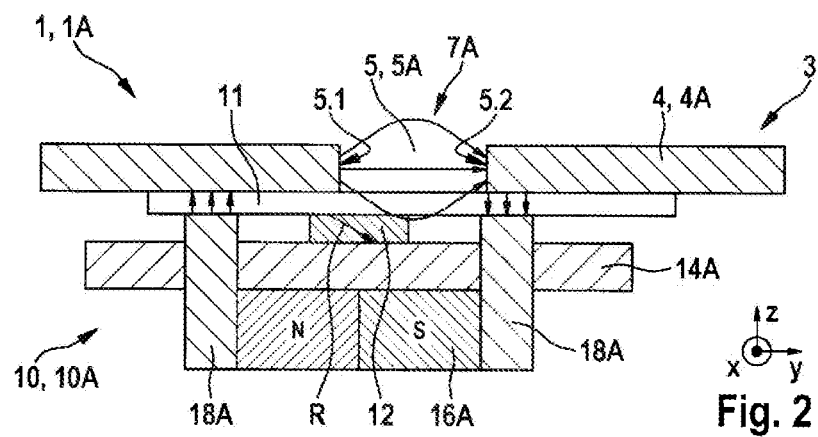
FIG. 2 shows a schematic sectional illustration of a first exemplary embodiment of a sensor arrangement according to the disclosure for contactless linear position detection with a first exemplary embodiment of a magnetic field sensor at a starting position.
Figure 3:
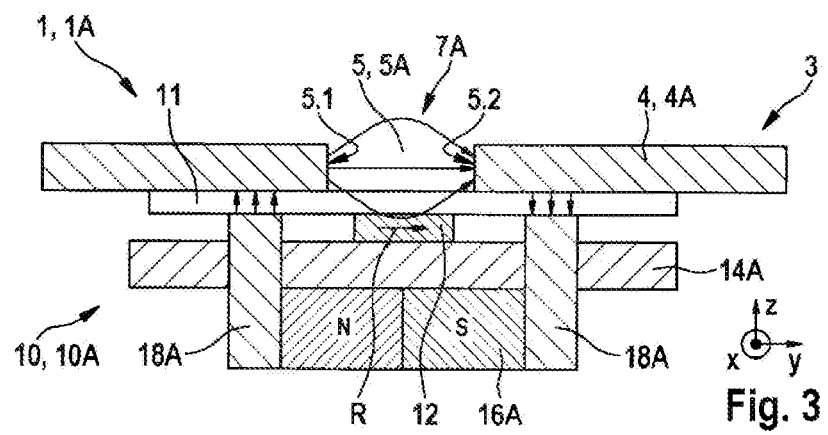
FIG. 3 shows a schematic sectional illustration of the first exemplary embodiment of the sensor arrangement according to the disclosure with the first exemplary embodiment of a magnetic field sensor at an intermediate position.
Figure 4:
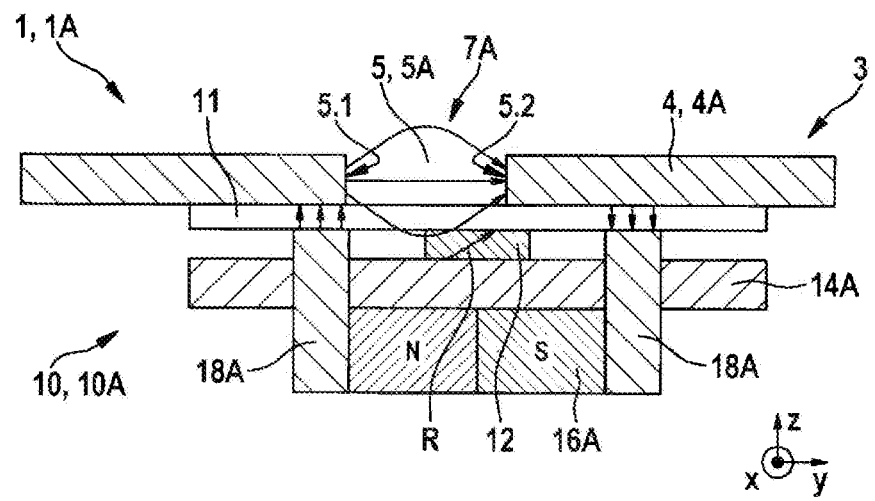
FIG. 4 shows a schematic sectional illustration of the first exemplary embodiment of the sensor arrangement according to the disclosure with the first exemplary embodiment of a magnetic field sensor at an end position.

As is also clear from FIGS. 2 to 4, a permanent magnet 16A is arranged below the measuring sensor 12 on a surface of the carrier 14A facing away from the measuring transducer 4 in the illustrated first exemplary embodiment of the sensor arrangement 1A with a first exemplary embodiment of the magnetic field sensor 10A. The permanent magnet 16A covers the measuring sensor 12 and the air gap 5A. In addition, two magnetic conductors 18A conduct the magnetic flux in the direction of the measuring transducer 4 and close a magnetic circuit. The magnetic circuit runs from the north pole of the permanent magnet 16A, via a left-hand magnetic conductor 18A, through the spacer 11 into the measuring transducer 4, through the air gap 5A and into the measuring transducer 4 again and from there, through the spacer 11, into a right-hand magnetic conductor 18A and then into the south pole of the permanent magnet 16A. As is also clear from FIG. 2, the measuring sensor 12 detects the direction R of the magnetic field 7A emerging from the measuring transducer 4 at the first edge 5.1 of the air gap 5A in the illustrated starting position A' of the magnetic field sensor 10A. In the intermediate position A of the magnetic field sensor 10A, illustrated in FIG. 3, the measuring sensor 12 detects the direction R of the magnetic field 7A running in a substantially horizontal manner. In the end position A" of the magnetic field sensor 10A, illustrated in FIG. 4, the measuring sensor 12 detects the direction R of the magnetic field 7A entering the measuring transducer 4 at the second edge 5.2 of the air gap 5A.

Figure 5:
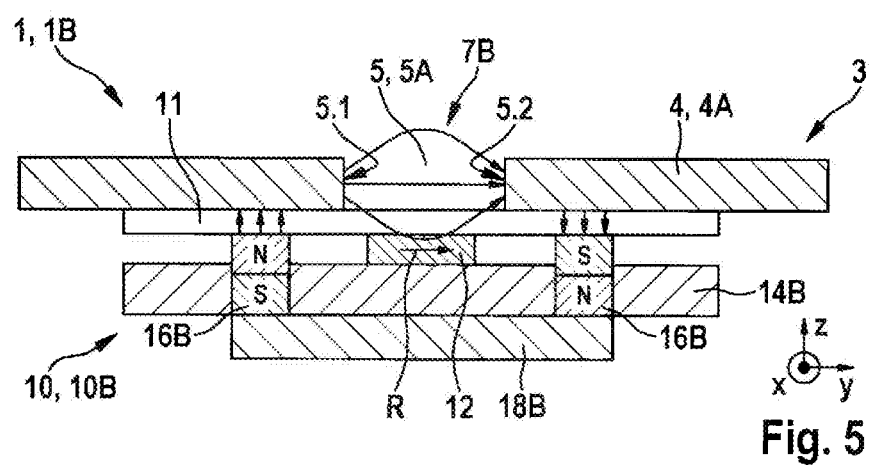
FIG. 5 shows a schematic sectional illustration of a second exemplary embodiment of a sensor arrangement according to the disclosure for contactless linear position detection with a second exemplary embodiment of a magnetic field sensor at an intermediate position.

As is also clear from FIG. 5, two permanent magnets 16B are laterally integrated in the carrier 14B beside the measuring sensor 12 and are oriented in the direction of the measuring transducer 4 in the illustrated second exemplary embodiment of the sensor arrangement 1B with a second exemplary embodiment of the magnetic field sensor 10B. In order to amplify the magnetic field 7B and to close the magnetic circuit, a magnetic conductor 18B is arranged on a surface of the carrier 14B facing away from the measuring transducer 4, which conductor connects the two permanent magnets 16B to one another and covers the air gap 5A. The magnetic circuit runs from the north pole of a left-hand permanent magnet 16B through the spacer 11 into the measuring transducer 4, through the air gap 5A into the measuring transducer 4 again and from there, through the spacer 11, into the south pole of the right-hand permanent magnet 16B and, from the north pole of the right-hand permanent magnet, through the magnetic conductor 18B, back into the south pole of the left-hand permanent magnet 16B. As a result of the proximity to the target 2 or to the measuring transducer 4, the two permanent magnets 16B can be smaller than the permanent magnet 16A in the first exemplary embodiment.

Figure 6:
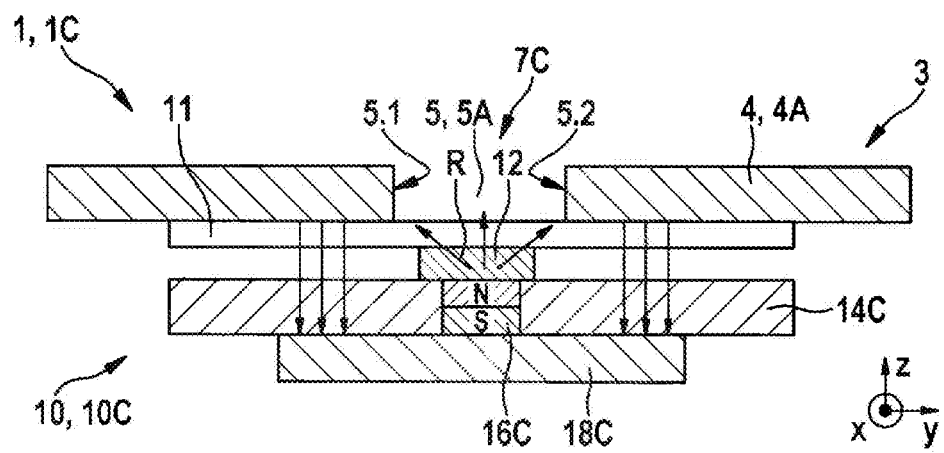
FIG. 6 shows a schematic sectional illustration of a third exemplary embodiment of a sensor arrangement according to the disclosure for contactless linear position detection with a third exemplary embodiment of a magnetic field sensor at an intermediate position.
Figure 7:
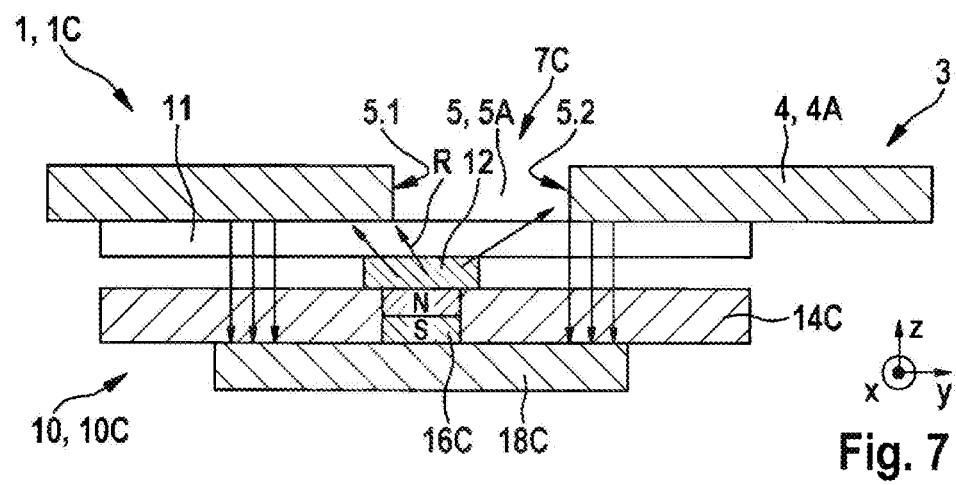
FIG. 7 shows a schematic sectional illustration of the third exemplary embodiment of the sensor arrangement according to the disclosure with the third exemplary embodiment of a magnetic field sensor at the starting position.

As is also clear from FIGS. 6 and 7, a permanent magnet 16C is integrated in the carrier 14C under the measuring sensor 12 in the illustrated third exemplary embodiment of the sensor arrangement 1C with a third exemplary embodiment of the magnetic field sensor 10C. In this case, the measuring sensor 12 covers the permanent magnet 16C. In addition, a magnetic conductor 18C is arranged on a surface of the carrier 14C facing away from the measuring transducer 4 and covers the measuring sensor 12 and the air gap 5A.

As is also clear from FIGS. 5 and 6, two magnetic circuits are produced by this arrangement. In this case, a first magnetic circuit runs from the north pole of the permanent magnet 16C through the measuring sensor 12 and the spacer 11, through the air gap 5A to the first edge 5.1 of the air gap 5A and into the measuring transducer 4 and from there, through the spacer 11 and the carrier 14C, into the magnetic conductor 18C and back into the south pole of the permanent magnet 16C. A second magnetic circuit runs from the north pole of the permanent magnet 16C through the measuring sensor 12 and the spacer 11, through the air gap 5A to the second edge 5.2 of the air gap 5A and into the measuring transducer 4 and from there, through the spacer 11 and the carrier 14C, into the magnetic conductor 18C and back into the south pole of the permanent magnet 16C. In the intermediate position A of the magnetic field sensor 10C, illustrated in FIG. 6, the strength of the two magnetic circuits is the same. In the starting position A' of the magnetic field sensor 10C, illustrated in FIG. 7, the strength of the left-hand magnetic circuit is greater than the strength of the right-hand magnetic circuit.

As is also clear from FIGS. 8 to 11, a permanent magnet 16D is integrated in the carrier 14D downstream of the measuring sensor 12 in the direction of the measuring path M and covers the air gap 5A in the illustrated fourth exemplary embodiment of the sensor arrangement 1D with a fourth exemplary embodiment of the magnetic field sensor 10D. Furthermore, a magnetic conductor 18D is arranged under the permanent magnet 16D on a surface of the carrier 14D facing away from the measuring transducer 4 and covers the permanent magnet 16D and the air gap 5A. In this configuration, the permanent magnet 16D can be arranged closer to the target 3 or the measuring transducer 4, as a result of which a larger magnetic field 7D is produced. In an alternative exemplary embodiment which is not illustrated, a permanent magnet 16D can be integrated in the carrier 14D upstream of the measuring sensor 12 in the direction of the measuring path M.

Figure 8:
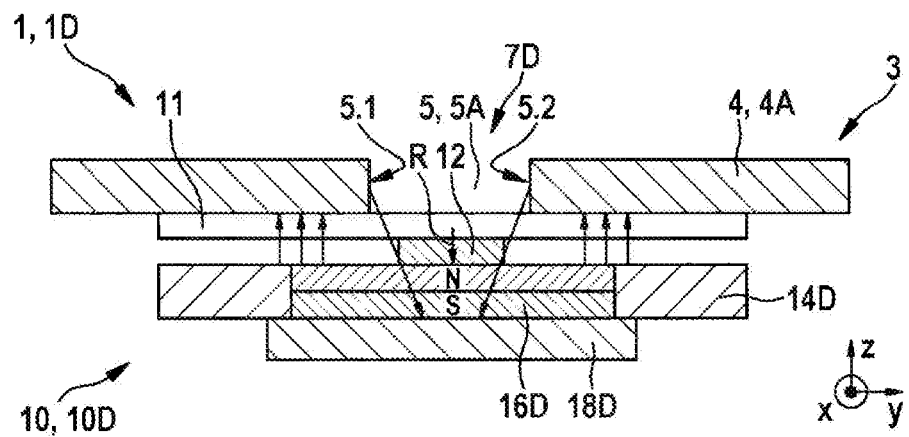
FIG. 8 shows a schematic sectional illustration of a fourth exemplary embodiment of a sensor arrangement according to the disclosure for contactless linear position detection with a fourth exemplary embodiment of a magnetic field sensor at an intermediate position.
Figure 9:
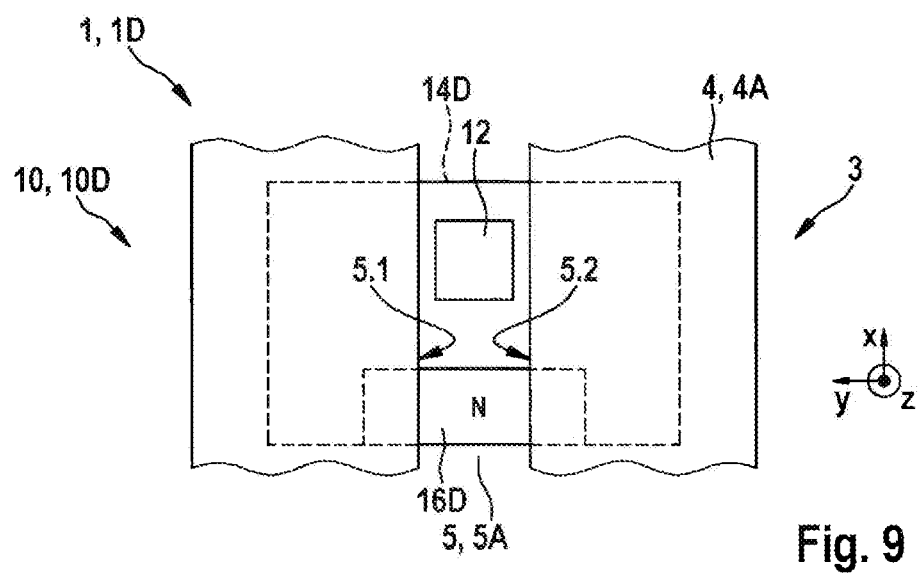
FIG. 9 shows a schematic plan view of the fourth exemplary embodiment of the sensor arrangement from FIG. 8.
Figure 10:
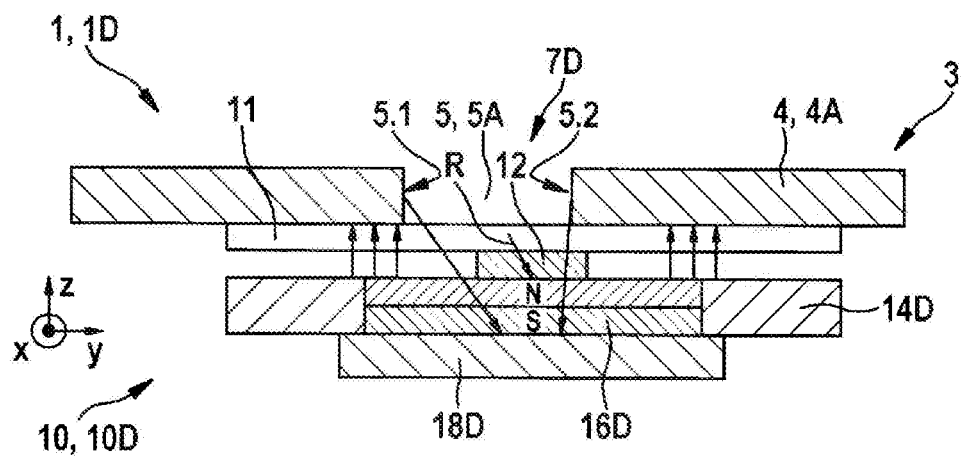
FIG. 10 shows a schematic sectional illustration of the fourth exemplary embodiment of the sensor arrangement with the fourth exemplary embodiment of a magnetic field sensor at the end position.
Figure 11:
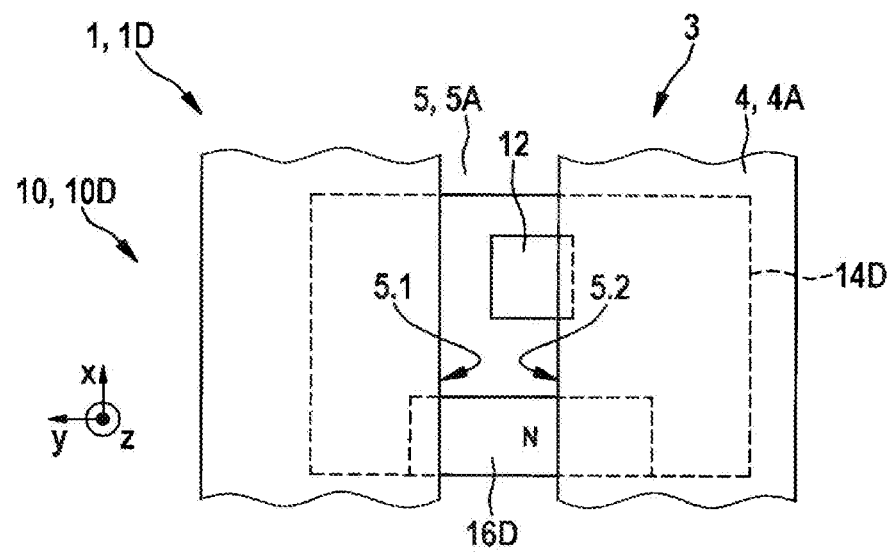
FIG. 11 shows a schematic plan view of the fourth exemplary embodiment of the sensor arrangement from FIG. 10.

As is also clear from FIGS. 8 and 10, two magnetic circuits are produced by this arrangement. In this case, a first magnetic circuit runs from the north pole of the permanent magnet 16C through the spacer 11 into the measuring transducer 4 and from there into the air gap 5A at the first edge 5.1 and, via the spacer 11, into the magnetic conductor 18D and back into the south pole of the permanent magnet 16D. A second magnetic circuit runs from the north pole of the permanent magnet 16D through the spacer 11 into the measuring transducer 4 and from there into the air gap 5A at the second edge 5.2 and, via the spacer 11, into the magnetic conductor 18D and back into the south pole of the permanent magnet 16D. In the intermediate position A of the magnetic field sensor 10D, illustrated in FIGS. 8 and 9, the strength of the two magnetic circuits is the same. In the end position A' of the magnetic field sensor 10D, illustrated in FIGS. 10 and 11, the strength of the right-hand magnetic circuit is greater than the strength of the left-hand magnetic circuit.

Embodiments of the present disclosure can further improve the position detection by using a plurality of measuring sensors or a plurality of air gaps in order to increase the resolution, the operating range or the immunity to external fields.

What is claimed is:

1. A sensor arrangement for contactless linear position detection, comprising:
   a target including a measuring transducer running along a measuring path;
   a magnetic field sensor arranged at a distance from the measuring transducer and arranged in a relatively movable manner along the measuring path, the magnetic field sensor configured to at least partially cover the measuring transducer,
   wherein the measuring transducer is magnetically conductive,
   wherein the magnetic field sensor includes a carrier having (i) at least one measuring sensor including a two-dimensional or three-dimensional detection range, and (ii) at least one permanent magnet configured to generate a local magnetic field,
   wherein magnetic flux of the local magnetic field is introduced into the measuring transducer,
   wherein the measuring transducer includes at least one air gap configured to influence the introduced magnetic flux based on a current position of the magnetic field sensor along the measuring path, and
   wherein the at least one measuring sensor is configured to detect a current direction of the local magnetic field; and
   an evaluation and control unit configured to evaluate the current direction of the local magnetic field in order to determine the current position of the magnetic field sensor based on the measuring path,
   wherein the at least one air gap extends completely through the measuring transducer.

2. The sensor arrangement according to claim 1, wherein the at least one measuring sensor includes a Hall sensor element, a GMR sensor element, or an AMR sensor element.

3. The sensor arrangement according to claim 1, wherein the at least one permanent magnet is arranged below the at least one measuring sensor on a surface of the carrier facing away from the measuring transducer.

4. The sensor arrangement according to claim 1, wherein the at least one permanent magnet includes two permanent magnets laterally integrated in the carrier beside the at least one measuring sensor and oriented in a direction of the measuring transducer.

5. The sensor arrangement according to claim 4, further comprising:
   a magnetic conductor arranged on a surface of the carrier facing away from the measuring transducer and configured to connect the two permanent magnets to one another and to cover the at least one air gap.

6. The sensor arrangement according to claim 1, wherein the at least one permanent magnet is integrated in the carrier under the at least one measuring sensor.

7. The sensor arrangement according to claim 6, wherein the at least one measuring sensor covers the at least one permanent magnet, and the sensor arrangement further comprises:
   a magnetic conductor arranged on a surface of the carrier facing away from the measuring transducer and configured to cover the at least one measuring sensor and the at least one air gap.

8. The sensor arrangement according to claim 1, wherein the at least one permanent magnet is integrated in the carrier upstream or downstream of the at least one measuring sensor in a direction of the measuring path and is configured to cover the at least one air gap.

9. The sensor arrangement according to claim 8, further comprising:
   a magnetic conductor arranged under the at least one permanent magnet on a surface of the carrier facing away from the measuring transducer and configured to cover the permanent magnet and the at least one air gap.

10. A sensor arrangement for contactless linear position detection, comprising:
    a target including a measuring transducer running along a measuring path;
    a magnetic field sensor arranged at a distance from the measuring transducer and arranged in a relatively movable manner along the measuring path, the magnetic field sensor configured to at least partially cover the measuring transducer,
    wherein the measuring transducer is magnetically conductive,
    wherein the magnetic field sensor includes a carrier having (i) at least one measuring sensor including a two-dimensional or three-dimensional detection range, and (ii) at least one permanent magnet configured to generate a local magnetic field,
    wherein magnetic flux of the local magnetic field is introduced into the measuring transducer,
    wherein the measuring transducer includes at least one air gap configured to influence the introduced magnetic flux based on a current position of the magnetic field sensor along the measuring path, and wherein the at least one measuring sensor is configured to detect a current direction of the local magnetic field; and an evaluation and control unit configured to evaluate the current direction of the local magnetic field in order to determine the current position of the magnetic field sensor based on the measuring path, wherein the at least one air gap has a predefined width and length, and wherein a longitudinal direction of the at least one air gap runs at a predefined angle with respect to the measuring path.

11. The sensor arrangement according to claim 10, wherein the at least one measuring sensor below the at least one air gap is configured (i) to detect the current direction of the local magnetic field at a first edge of the at least one air gap in a starting position and at a second edge of the at least one air gap in an end position, (ii) for movement along the measuring path from the starting position to the end position over the predetermined width of the at least one air gap, and (iii) to detect the current direction of the local magnetic field over the predetermined width of the at least one air gap.

12. The sensor arrangement according to claim 10, wherein the at least one measuring sensor includes a Hall sensor element, a GMR sensor element, or an AMR sensor element.

13. The sensor arrangement according to claim 10, wherein the at least one permanent magnet includes two permanent magnets laterally integrated in the carrier beside the at least one measuring sensor and oriented in a direction of the measuring transducer.

14. The sensor arrangement according to claim 13, further comprising:
a magnetic conductor arranged on a surface of the carrier facing away from the measuring transducer and configured to connect the two permanent magnets to one another and to cover the at least one air gap.

15. The sensor arrangement according to claim 10, wherein the at least one permanent magnet is integrated in the carrier upstream or downstream of the at least one measuring sensor in a direction of the measuring path and is configured to cover the at least one air gap.

16. A sensor arrangement for contactless linear position detection, comprising:
a target including a measuring transducer running along a measuring path;
a magnetic field sensor arranged at a distance from the measuring transducer and arranged in a relatively movable manner along the measuring path, the magnetic field sensor configured to at least partially cover the measuring transducer,
wherein the measuring transducer is magnetically conductive,
wherein the magnetic field sensor includes a carrier having (i) at least one measuring sensor including a two-dimensional or three-dimensional detection range, and (ii) at least one permanent magnet configured to generate a local magnetic field,
wherein magnetic flux of the local magnetic field is introduced into the measuring transducer,
wherein the measuring transducer includes at least one air gap configured to influence the introduced magnetic flux based on a current position of the magnetic field sensor along the measuring path, and
wherein the at least one measuring sensor is configured to detect a current direction of the local magnetic field; and
an evaluation and control unit configured to evaluate the current direction of the local magnetic field in order to determine the current position of the magnetic field sensor based on the measuring path,
wherein the at least one measuring sensor is arranged on a surface of the carrier facing the measuring transducer.

17. The sensor arrangement according to claim 16, further comprising:
a spacer arranged between the at least one measuring sensor and the measuring transducer.

18. The sensor arrangement according to claim 16, further comprising:
two magnetic conductors configured to conduct magnetic flux in a direction of the measuring transducer,
wherein the at least one permanent magnet covers the at least one measuring sensor and the at least one air gap.

19. The sensor arrangement according to claim 16, wherein the at least one measuring sensor includes a Hall sensor element, a GMR sensor element, or an AMR sensor element.

20. The sensor arrangement according to claim 16, wherein the at least one permanent magnet includes two permanent magnets laterally integrated in the carrier beside the at least one measuring sensor and oriented in a direction of the measuring transducer.

* * * * *